(12) United States Patent
Li et al.

(10) Patent No.: US 11,209,870 B1
(45) Date of Patent: Dec. 28, 2021

(54) MULTI-ANGLE SUPPORT COVER FOR ELECTRONIC DEVICES

(71) Applicant: Apple Inc., Cupertino, CA (US)

(72) Inventors: Zhengyu Li, Shanghai (CN); Chia Chi Wu, Taipei (TW); Qiliang Xu, Livermore, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/630,708

(22) Filed: Jun. 22, 2017

(51) Int. Cl.
*A45C 11/00* (2006.01)
*G06F 1/16* (2006.01)
*A47B 23/04* (2006.01)
*F16B 1/00* (2006.01)
*F16M 11/38* (2006.01)

(52) U.S. Cl.
CPC .......... *G06F 1/1656* (2013.01); *A47B 23/043* (2013.01); *F16B 1/00* (2013.01); *F16M 11/38* (2013.01); *G06F 1/1626* (2013.01); *A47B 2023/049* (2013.01); *F16B 2001/0035* (2013.01); *G06F 1/169* (2013.01); *G06F 1/1662* (2013.01)

(58) Field of Classification Search
CPC ........ A45C 2011/001; A45C 2011/002; A45C 2011/003; A45C 2200/15; G06F 1/1626; A47B 2023/049; A47B 23/043; A47B 23/044; F16B 2001/0035
USPC ........ D14/439, 440, 447; 248/454; 206/45.2
See application file for complete search history.

(56) References Cited

U.S. PATENT DOCUMENTS

| D672,781 S * | 12/2012 | Lu .............................. D14/440 |
| 8,393,464 B2 | 3/2013 | Yang et al. |
| 8,640,864 B2 | 2/2014 | Chen et al. |
| 8,915,357 B2 | 12/2014 | Mecchella |
| 9,049,911 B1 | 6/2015 | Wood et al. |
| D807,365 S * | 1/2018 | Liu ............................. D14/440 |
| 9,946,295 B2 * | 4/2018 | Smith ................... G06F 1/1669 |
| 2004/0234175 A1 * | 11/2004 | Takita .................... B65D 33/02 383/88 |
| 2012/0194448 A1 * | 8/2012 | Rothkopf ............. A45C 13/002 345/173 |
| 2013/0134061 A1 * | 5/2013 | Wu ....................... G06F 1/1626 206/320 |

(Continued)

OTHER PUBLICATIONS

D672781_annotated_fig1.pdf (Year: 2012).*
DHGate.com; <http://www.dhgate.com/product/ultrathin-luxury-transformers-leather-phone/395244133.html>.

*Primary Examiner* — Allan D Stevens
(74) *Attorney, Agent, or Firm* — Dickinson Wright RLLP

(57) ABSTRACT

Accessory units for electronic devices are described. The accessory units can include a panel that has a flexible substrate with a network of structural elements that are arranged to fold the panel into different forms and shapes similar to origami. For example, the panel can be bent along one or more fold lines that are defined by adjacent structural elements. In some cases, the panels are configured to fold at preferred fold lines, sometimes in non-parallel orientations with respect to each other. In one case, the accessory can be unfolded into a flat configuration and serve as a cover for the electronic device. In some cases, the accessory units can be brought behind and support an electronic device at different angles with respect to a support surface. The accessory units can also include features such as keyboards, touch pads, or other input devices for the electronic devices.

11 Claims, 13 Drawing Sheets

(56) References Cited

U.S. PATENT DOCUMENTS

| | | | |
|---|---|---|---|
| 2013/0146482 A1* | 6/2013 | Huang | A47B 23/043 |
| | | | 206/45.23 |
| 2013/0230202 A1* | 9/2013 | Widner | H04R 5/02 |
| | | | 381/333 |
| 2013/0258586 A1* | 10/2013 | Shao | A45C 11/00 |
| | | | 361/679.55 |
| 2014/0083883 A1* | 3/2014 | Elias | G06F 1/1626 |
| | | | 206/320 |
| 2015/0001105 A1* | 1/2015 | Nyholm | A45C 11/00 |
| | | | 206/45.2 |
| 2015/0183550 A1* | 7/2015 | Jiang | A45C 11/00 |
| | | | 206/766 |
| 2015/0280768 A1* | 10/2015 | Huang | H04B 1/3888 |
| | | | 455/575.8 |
| 2016/0066667 A1* | 3/2016 | Yu | A45C 11/00 |
| | | | 224/191 |
| 2016/0197634 A1* | 7/2016 | Lockwood | G06F 1/1632 |
| | | | 455/575.8 |
| 2016/0282955 A1* | 9/2016 | Ko | G06F 3/0202 |
| 2017/0143088 A1* | 5/2017 | Sirichai | A45C 11/00 |
| 2017/0351299 A1* | 12/2017 | Li | A45C 13/005 |

\* cited by examiner

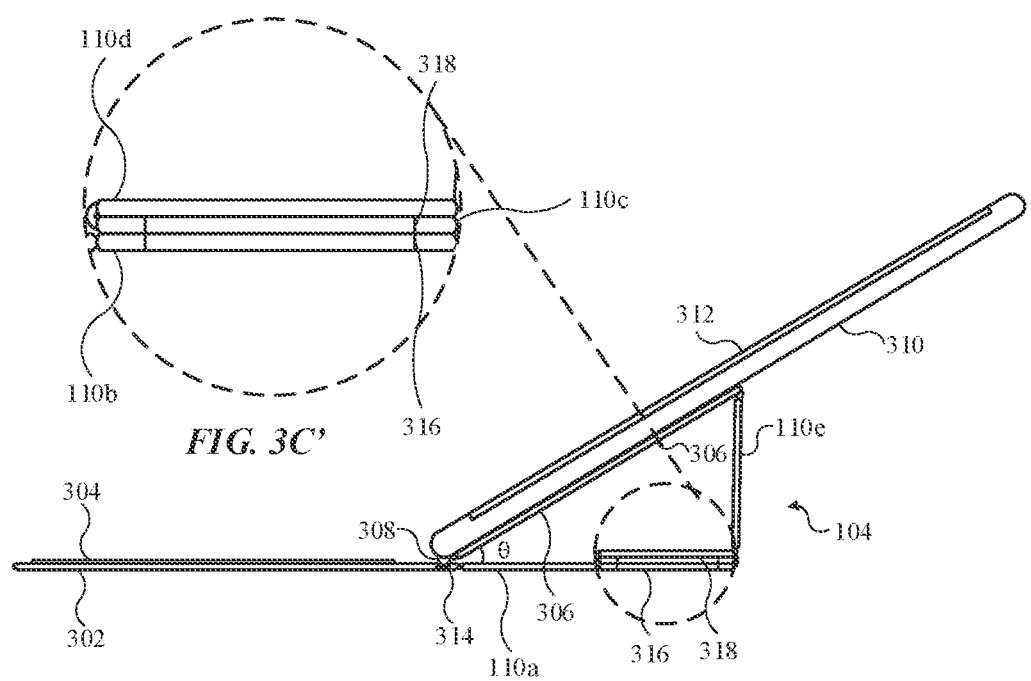
FIG. 3C'
FIG. 3C
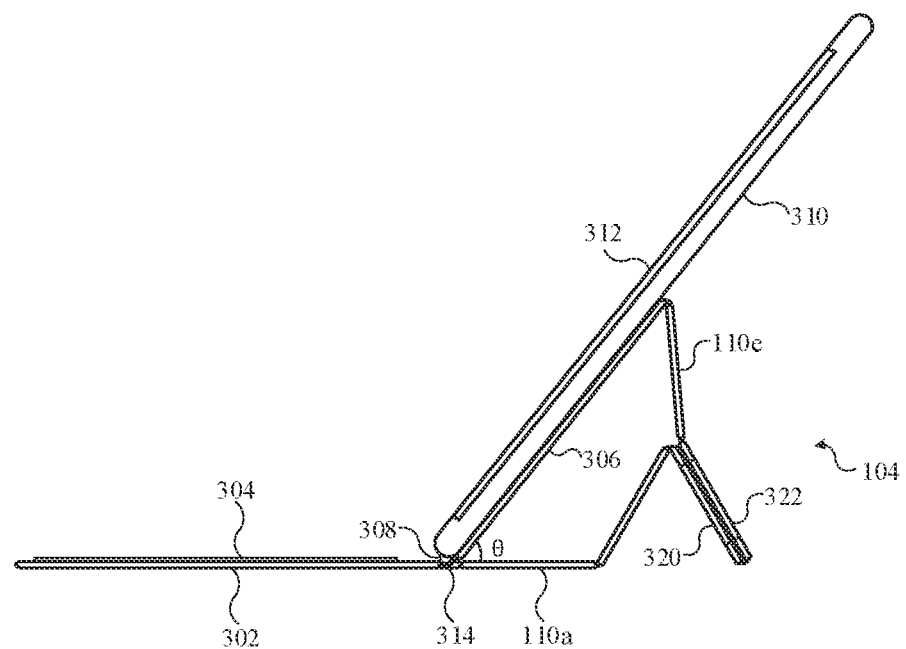
FIG. 3D

MULTI-ANGLE SUPPORT COVER FOR ELECTRONIC DEVICES

FIELD

The described embodiments relate generally to accessories for electronic devices. More particularly, the described embodiments relate to accessories such as cases, covers and/or flaps. Even more particularly, the described embodiments relate to accessories that can have reconfigurable shapes and sizes.

BACKGROUND

Recent advances in computing devices have made portable electronic devices increasingly more prevalent. Users often pair different accessories with their electronic devices to add features and/or to customize their electronic devices. Besides adding functionalities to the electronic devices, accessories can be protective in nature or simply an aesthetically pleasing adornment, or in some cases be both protective and ornamental in nature. Portable electronic devices often serve multiple purposes, such as presenting videos, for typing, for drawing, etc. As portable electronic devices become more versatile, there are needs for improved accessories that are suitable for portable electronic devices in different circumstances.

SUMMARY

This paper describes various accessories for electronic devices that are designed to support and present the electronic devices at multiple angles to a user. In some embodiments, the accessories can be used on different types and sizes of portable electronic devices.

According to one embodiment, an accessory for use with an electronic device is described. The accessory can include a flap having an edge. The flap can include a flexible substrate and structural elements. The structural elements can have generally same size and shape. The structural elements can be carried within the flexible substrate. The structural elements can also be separated from each other by foldable regions and arranged in a pattern such that adjacent structural elements are movable in accordance with the foldable regions along (i) a fold line that is non-parallel to the edge and (ii) a fold line that is parallel to the edge. In a folded configuration, the flap can form a three dimensional structure capable of supporting the electronic device.

According to another embodiment, an accessory that includes an edge configured to removably couple with an electronic device is described. The accessory can include structural elements being carried within a flexible substrate and separated from each other by foldable regions to define fold lines between the structural elements. The structural elements can be arranged in columns, rows and diagonal groups such that the fold lines comprises longitudinal fold lines, lateral fold lines, and diagonal fold lines relative to the edge. The accessory can be configured into more than one three-dimensional configurations that can support the electronic device at different inclination angles.

According to yet another embodiment, a method of manufacturing an accessory having an edge for an electronic device is described. The method includes forming a flexible substrate from a flexible material. The method also includes arranging structural elements having generally same size and shape within the flexible substrate such that the flexible substrate can bend along (i) a fold line that is non-parallel to the edge and (ii) a fold line that is parallel to the edge.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which:

FIGS. 3B, 3C, 3C', and 3D illustrate different configuration of an electronic system including an electronic device and the accessory shown in FIG. 3A.

Figure 1A:
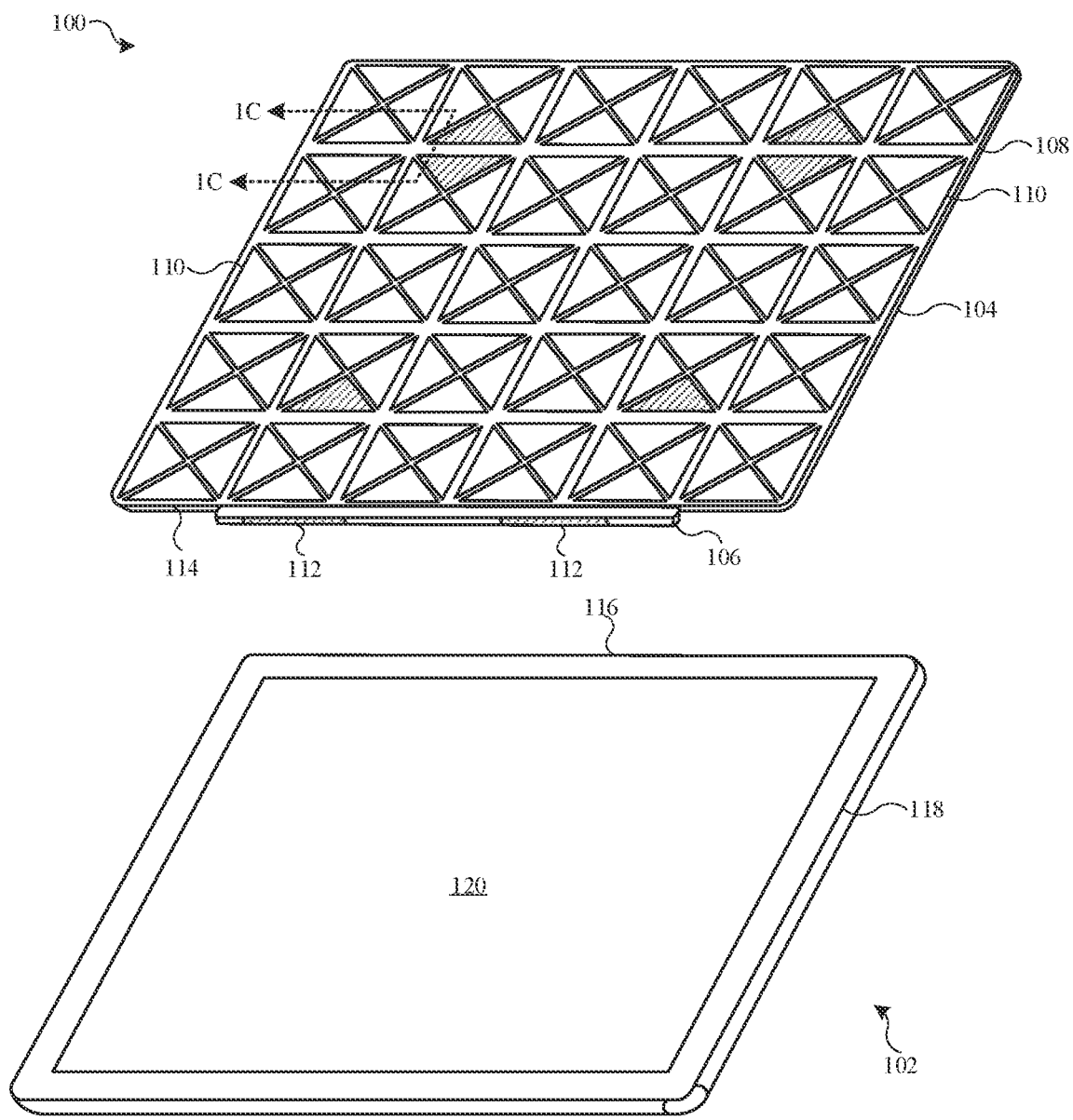
FIG. 1A illustrates an isometric view of an electronic system that can include an accessory coupled with an electronic device in accordance with some embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Accessories for electronic devices (e.g., mobile phones, tablet computers, laptop computers, etc.) can add benefits and functionalities to the electronic devices. For example, an accessory may take the form of a cover (e.g., a flap, case, or folio) and provide benefits to an electronic device in the form of protection and/or improved appearance. Conventionally, an accessory's size and shape may be restricted because the accessory may be designed in accordance with the dimension of the electronic device. The accessories described herein can be arranged into different forms and shapes so that the accessories can be customized in accordance with particular electronic devices. In some embodiments, the accessories can take the form or include a flat panel that can be folded into a multitude of three-dimensional shapes. The panel can be reversibly configured between a flat sheet and different three-dimensional shapes similar to the concept of origami. The flexibility of the foldable panel allows the accessory to be used with the electronic devices in different ways to serve different purposes, depending on the circumstances.

According to some embodiments, an accessory can include a foldable panel that can be formed from a flexible substrate and that can carry a network of structural elements. At least some structural elements are rigid enough such that those structural elements are not able to bend or be forced out of shape by normal human force. On the other hands, the structural elements are separated. Hence, adjacent structural elements can define regions of the flexible substrate that remain flexible, thus allowing the foldable panel to bend along one or more fold lines define by the network of structural elements. In one case, the structural elements can be aligned and separated by linearly foldable regions. Hence, at least some of the fold lines can be linear. In some cases, there can be multiple fold lines in different non-parallel directions, such as lateral, longitudinal and diagonal directions. In some cases, the fold lines intersect with each other. In some cases, the foldable panel is designed to preferably fold along certain fold lines over other fold lines.

The presence of multiple fold lines can enable the accessory to serve different purposes for the electronic device. For example, in one situation, the foldable accessory can take on a flat so that it can cover and protect a flat surface of the electronic device, such as a display of the electronic device. In other situations, the accessory can be folded into different three-dimensional configurations that can be used, for example, to support the back of an electronic device at multiple angles with respect to a support surface. The structural elements can provide structural integrity to the accessory so that the accessory can stably retain a three-dimensional shape without collapsing. In some cases, the structural elements can include magnets and/or an internal skeleton that help retain the foldable panel in one or more folded configurations.

The accessory units described herein can be used with any suitable electronic device or devices. In some embodiments, the accessory units are well suited for use with portable electronic devices. For example, the accessories may be used in combination with tablet computers, mobile phones, wearable electronic devices, etc., including those manufactured by Apple Inc., based in Cupertino, Calif.

These and other embodiments are discussed below with reference to FIGS. 1A-11; however, those skilled in the art will readily appreciate that the detailed description given herein with respect to these figures is for explanatory purposes only and should not be construed as limiting.

FIG. 1A is an isometric view of an electronic system that can include an accessory 100 coupled with an electronic device 102 in accordance with some embodiments. It should be noted that accessory 100 can sometimes be referred to as accessory unit, accessory device, accessory panel, etc. In the particular embodiment shown in FIG. 1A, accessory 100 can take the form of a flap that includes foldable panel 104 and a hinge portion 106. It should be also understood that accessory 100 can include more parts. For example, as it will be discussed in further detail in associated with other figures, accessory 100 can include other panels and/or additional input devices. Foldable panel 104 can include substrate 108 and multiple structural elements 110 carried within substrate 108. Structural elements 110 can be arranged in a pattern and be separated from each other to allow panel 104 to be folded in different manners that will be described in detail below. The hinge portion 106 of accessory 100 can include one or more device-coupling magnetic elements 112. It should be understood that hinge portion 106 can be optional and device-coupling magnetic elements 112 can be directly carried by panel 104 at edge 114. Device-coupling magnetic elements 112 can be configured to magnetically couple with an edge 116 of an electronic device 102.

While device-coupling magnetic elements 112 are shown, it should be understood that in some embodiments panel 104 can be attached to an electronic device via other ways, including frictional fit, mechanical fastening, or any suitable combination of mechanical or magnetic ways. Also, accessory 100 can be fixedly coupled to electronic device 102 via hinge portion 106. In some cases, hinge portion 106 or edge 114 of accessory 100 can additionally include electrical terminals (such as at the locations near 112) that are coupled to electronic device 102. The electrical terminals can be adapted to transfer and exchange information, signals and power between accessory 100 and electronic device 102 in a manner that will be described in further detail below.

Referring to electronic device 102, electronic device 102 can include housing 118 having a rear side and a front side. The front side of housing 118 can have edges that define an opening at which a display assembly 120 is carried. Display assembly 120 can be designed to present visual information, in the form of still images and/or video. The display assembly 120 can include a capacitive touch sensitive layer designed to receive a touch input to alter the visual information. Also, the electronic device 102 can include a protective cover that overlays the display assembly 120. The protective cover can include a transparent material, such as glass or sapphire, as non-limiting examples.

Figure 1B:
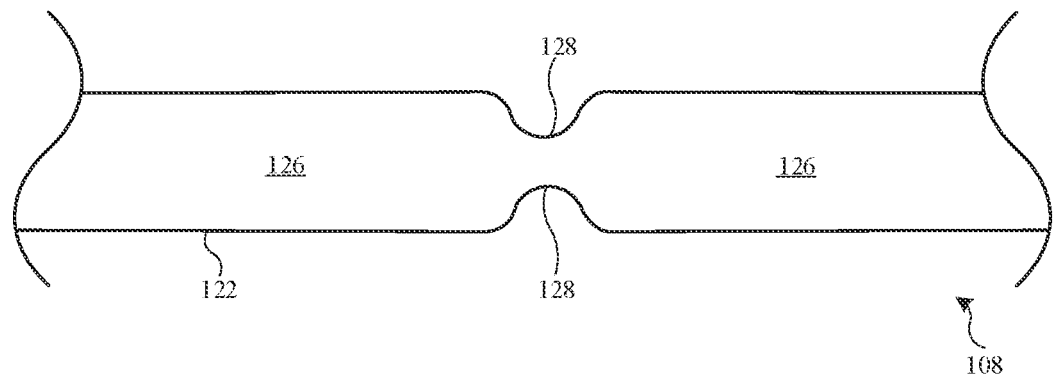
FIGS. 1B-1D illustrates partial internal views of some accessories in accordance with some embodiments.
Figure 1C:
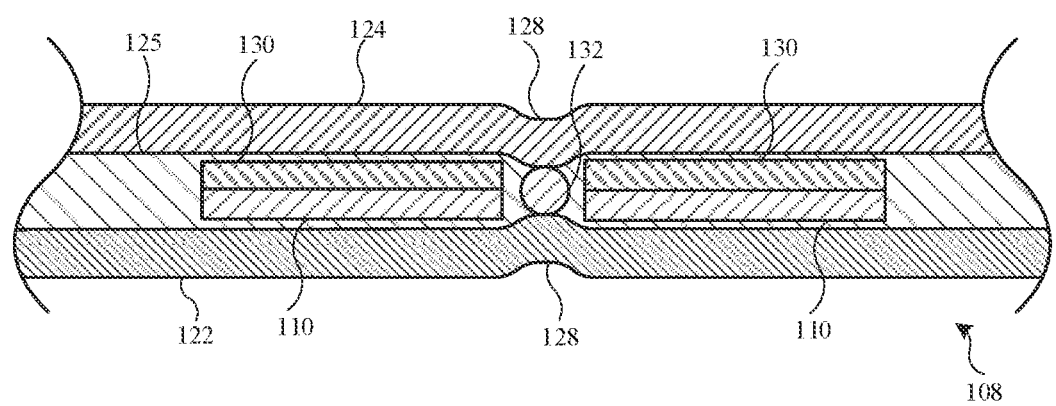
Figure 1D:
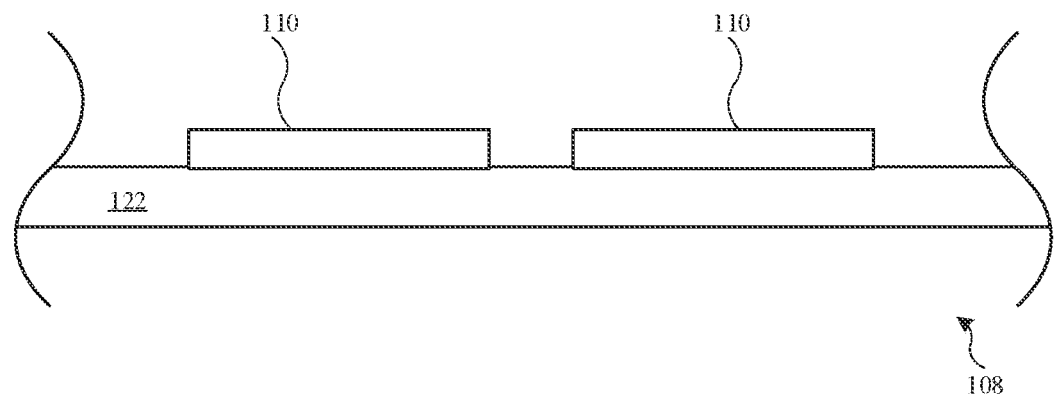

FIGS. 1B-1D are different partial internal views showing different exemplary internal arrangements of accessory 100. FIG. 1C shows a partial cross sectional view of the accessory 100 shown in FIG. 1A. In some embodiments, substrate 108 can include multiple layers of material with structural elements 110 being embedded within one or more layers. For example, in one possible arrangement as shown in FIG. 1B, substrate 108 can include first outer layer 122 that is coupled with second outer layer 124 via adhesive 126. Structural elements 110 can be sandwiched between first outer layer 122 and second outer layer 124 and be secured by adhesive 126. In this arrangement, structural elements 110 can be wrapped inside substrate 108 such that surfaces of structural elements 110 are not directly visible to a user. Substrate 108 can optionally include dips 128 at regions between adjacent structural elements 110. The dips 128 can allow substrate 108 to be bent more easily at regions that are free of structural elements 110.

In another possible arrangement as shown in FIG. 1C, substrate 108 can optionally carry magnetic elements 130 and/or wires 132 for purposes that will be described in further detail below. It should be noted that, in some cases, some or all of structural elements 110 can themselves be magnetic and, thus, no separate magnetic elements 130 are needed. Wires 132 can be located at regions between two adjacent structural elements 110. In yet another possible arrangement as shown in FIG. 1D, a second outer layer may be absent such that structural elements 110 are exposed.

It should be understood that, while the first outer layer 122 or the second outer layer 124 is shown as a single layer, each of the first outer layer 122 or the second outer layer 124 can include multiple layers or sub-layers 125. Also, while three possible arrangements of substrate 108 are shown in FIGS. 1B-1D, these arrangements are intended to be exemplary and are not intended to limit the range of other possible embodiments.

Substrate 108 can be formed of any suitable material, including flexible material such as fabrics, leathers, rubbers, other flexible plastic, other suitable polymers, or any suitable combination thereof. Substrate 108 can allow accessory 100 to be bent or folded in a manner that will be described in further detail below. Both first outer layer 122 and second outer layer 124 can be flexible and can be formed from same materials to give a coherent and aesthetic appearance to accessory 100. However, first outer layer 122 and second outer layer 124 can also be formed from different materials. First outer layer 122 and second outer layer 124 can be attached together by gluing, adhesive bonding, thermal sealing or any mechanical fastening. In the particular cases shown in FIGS. 1B and 1C, first outer layer 122 and second outer layer 124 are coupled together via adhesive 126. In some cases, first outer layer 122 and second outer layer 124 can be molded together as an integrated single piece. In the cases of fabrics, leathers, or similar polymers, first outer layer 122 and second outer layer 124 can be stitched together. The stitching can be performed along the shapes and positions of the structural elements 110 to form multiple individual pockets, each of which can carry a structural element 110. The exterior of substrate 108, for example the surface of first outer layer 122 and second outer layer 124, can sometimes additionally include a ceramic material so that accessory 100 can be scratch-proof.

Structural elements 110 can be formed of any suitable rigid material, such as ceramic, metal, or polymer (e.g., hard plastic, high-density polycarbonate, fiberglass, or polyvinyl chloride). At least some of the structural elements 110 can be rigid (i.e. strong enough to resist against bending or reshaping by normal human force). In some embodiments all structural elements 110 are formed of the same material, but in other embodiments different structural elements 110 are formed of different materials. Structural elements 110 can have a primarily flat shape in that their lengths are much larger than their heights, as shown in FIG. 1B. Magnetic elements 130 can be composed of any suitable magnetic material. In some cases, magnetic elements 130 are permanent magnets such as ceramic rare earth magnets (e.g., samarium-cobalt, neodymium, other rare earth magnets) or ferrous-based magnets. In some embodiments, magnetic elements 130 include a Hallback array of magnets.

In some cases, some or all of structural elements 110 are formed of magnetically attractive material, such as a ferromagnetic material (e.g., a ferrite, a ferrous metal or alloy of iron, nickel, or cobalt). For example, in one case, all of the structural elements 110 are formed of magnetically attractive materials. In another case, some of the structural elements 110 are formed of non-magnetic materials while others are formed of magnetically attractive materials. In this way, magnetic structural elements 110 can magnetically couple with other magnetic structural elements 110, or magnetically couple with those structural elements 110 that are made of a magnetically attractive material. That is, the attraction between two magnetically attractive elements can be formed between two magnets or between a magnet and a ferromagnetic material. Thus, magnetic element 130 and structural elements 110 that are made of a magnetically attractive material can be referred to as magnetically attractable elements.

Figure 1E:
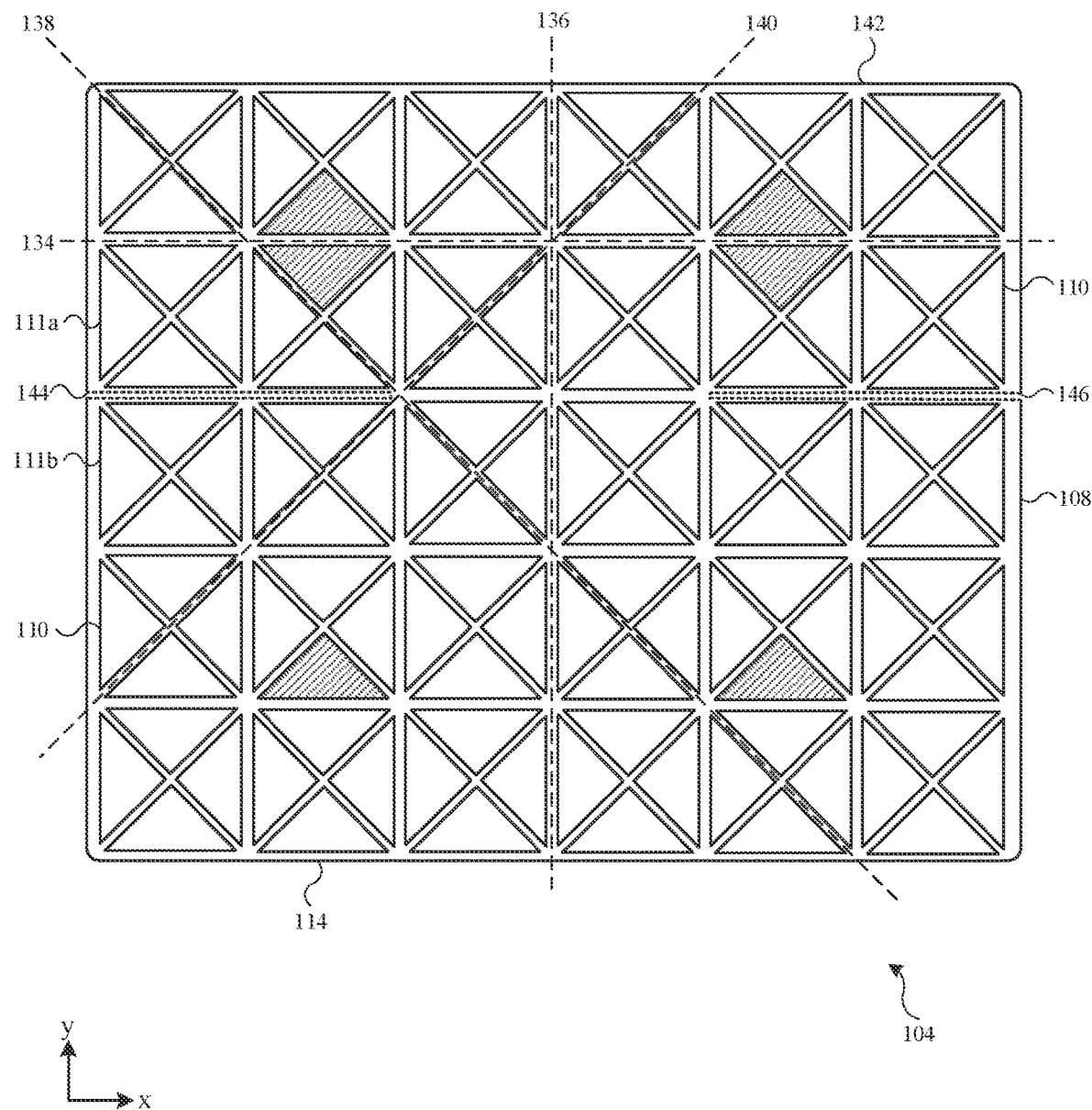
FIG. 1E illustrates a front view of a foldable panel in accordance with some embodiments.

Referring to FIG. 1E, a front view of a foldable panel 104 in accordance with some embodiment is shown. Structural elements 110 can be arranged and aligned in a repeating manner to form a segmented panel 104. The structural elements 110 can be characterized as having polygonal shapes. The structural elements 110 can have edges that are parallel aligned such that the structural elements 110 cooperate to form a network. Adjacent structural elements 110 can be separated and aligned so that the network of structural elements 110 define regions of substrate 108 that remains flexible even though substrate 108 carries a network of structural elements 110. The network of structural elements 110 can define fold lines along regions that are free of structural elements to allow panel 104 to be bent and folded. FIG. 1E illustrates several exemplary fold lines 134, 136, 138, and 140. The fold lines 134, 136, 138, and 140 can be along lateral directions, longitudinal directions, and diagonal directions. It should be noted that although only four exemplary fold lines 134, 136, 138, and 140 are labeled by broken lines, panel 104 as shown in FIG. 1E can include other lateral, longitudinal and diagonal fold lines such that panel 104 can be folded in many different ways. In some embodiments, at least some of the fold lines can be intersecting with other fold lines so that panel 104 is not limited to folded along a same parallel direction. Put differently, in some embodiments at least some of the fold lines can be non-parallel with respect other fold lines and/or can be non-parallel to one of edges 114 or 142 of panel 104. By providing multiple fold lines in different angles, panel 104 can have high degrees of freedom in terms of how panel 104 can be folded.

It should be noted the degrees of freedom on how panel 104 can be folded can largely depend on the shape, size, number and arrangement of the structural elements 110. FIG. 1E illustrates one possible arrangement of structural elements 110 in a repeating pattern. In the particular case shown in FIG. 1E, each structural element 110 can be characterized as having a triangular shape. The structural elements 110 can be divided into multiple groups of four and those groups can be arranged in a repeating pattern. Each group of four can include four triangular structural elements 110 that can be arranged in a radially symmetric manner to form a rectangle. Each triangle can be an isosceles triangle that can be orientated such that the vertex of the triangle can be located at or near the center of the rectangle and the base of the triangle can form one of the edges of the rectangle. In a particular case where the triangles have same dimension, the four edges of the rectangle (formed by the four bases of the four triangles) can have the same length so that the rectangle can be a square. However, the triangular structural elements 110 do not have to have the same dimensions. The rectangle can, for example, have shorter edges along the longitudinal direction (y direction) and longer edges along the lateral direction (x direction). In other words, in some cases the structural elements 110 can be identical while in other cases the structural elements 110 can be different.

Under the exemplary arrangement illustrated in FIG. 1E, the separation of structural elements 110 can define the angles of different fold lines of panel 104. For instance, in addition to the alignment of four triangular structural elements 110 within a rectangular group of four, different rectangular groups can also be aligned. In other words, the rectangular groups can be further arranged in rows and columns. In this context, a row can be a line of elements that are aligned along a direction that is parallel to edge 114 that is to be coupled with an electronic device (i.e. along x-direction or a lateral direction relative to edge 114). A column can be a line of elements that are aligned along a direction that is perpendicular or nearly perpendicular to edge 114 (i.e. along y-direction or a longitudinal direction relative to edge 114). As such, panel 104 can be segmented along multiple lateral and longitudinal directions and can be foldable along those directions, as represented by fold lines 134 and 136 and those other fold lines that are parallel to either 134 or 136. It should be noted that while five rows and six columns are shown in FIG. 1E, any numbers of rows and columns are possible.

Moreover, the diagonal edges of structural elements 110 can also be aligned within a rectangular group, and among different rectangular groups, such that diagonal fold lines can be formed. Hence, panel 104 can further be segmented along multiple diagonal directions and can additionally be foldable along those directions. In one case, panel 104 can be foldable along two different diagonal directions that are intersecting with each other, as represented by fold lines 138 and 140 and other fold lines that are parallel to either 138 or 140. Hence, by the particular configuration shown in FIG. 1E, there can be multiple fold lines in longitudinal direction that is generally parallel to fold line 136, multiple fold lines in lateral direction that is generally parallel to fold line 134, multiple fold lines in a first diagonal direction that is generally parallel to fold line 138, and multiple fold lines in a second diagonal direction that is generally parallel to fold line 140.

The multiple fold lines of panel 104 can allow panel 104 to be folded into different sizes and sometimes be folded to form different three-dimensional configurations similar to origami. In other words, a flat panel 104 can be reversibly folded between a flat sheet and different possible three-dimensional configurations. The structural elements 110 can still provide structure integrity to the folded panel 104 to maintain the folded panel 104 in those three-dimensional configurations. Since structural elements 110 remains rigid when panel 104 is folded, the structural elements 110 can be orientated at different angles and become facets of the three-dimensional configuration. Hence, the three-dimensional configuration can also be referred to as a multi-facet configuration. When a three-dimensional configuration is formed, the structural elements 110 can be arranged at different angles with respect to each other. Besides folding into different three-dimensional configurations, the fold lines can additionally allow the panel 104 to be folded into a smaller sizes or to a different shape so that the panel 104 can be coupled with different types of electronic devices and/or can fit into, for example, a handbag. Hence, the fold lines can alternatively or additionally accommodate a smaller electronic device and/or input device such as a keyboard, which will be discussed in further detail below.

In some cases, one or more slits (i.e. cut lines) 144 and 146 can optionally be included in panel 104 to further increase the degrees of freedom on how panel 104 can be folded. As it will be discussed in further detailed below, edges of panel 104 can sometimes be configured to be coupled to other panels or an electronic device such that part or all of the attached edges may be restrained (see, e.g. FIG. 3A). Those arrangements may affect how panel 104 can be folded. Slits 144 and 146 can be present at selected locations of panel 104 such as between some of the middle rows or columns. The slits can allow panel 104 to be folded partially in directions that are diagonal or perpendicular to the edges that are being restrained. For example, in one case, panel 104 may be restrained completely along edges 114 and 142 by an electronic device or other panels. Normally this may prevent panel 104 from being folded along some longitudinal directions (y direction) or along some diagonal directions or at least render such folding difficult. When slits 144 and/or 146 are present, panel 104 can have increased possible ways to be folded. For instance, the panel may include a first set of structural elements 111a and a second set of structural elements 111b, with the slit 144 allowing the first set of structural elements 111a to fold relative to the second set of structural elements 111b. Hence, the possible three-dimensional configurations of panel 104 can be increased even if certain edges of panel 104 may be restrained. It should be noted that slits 144 and 146 are optional, and in some embodiments it is preferable that slits 144 and 146 not be present.

Since panel 104 can be folded into different three-dimensional configurations, in some embodiments panel 104 can additionally include one or more magnetic elements 130 that are coupled to structural elements 110 at different locations of panel 104 to retain the three-dimensional configuration. For example, magnetic elements 130 can be located at the shaded structural elements 110 as shown in FIG. 1E. Magnetic elements 130 can be coupled with each other to form a magnetic circuit that generates an attractive force when panel 104 is folded, thereby holding panel 104 in the folded configuration. In some cases, magnetic elements 130 can be located at selected predetermined locations to facilitate certain preferred ways of folding panel 104 and also allow panel 104 to be folded into certain preferred three-dimensional configurations and retain those configurations. For instance, one or more pairs of magnetically attractive elements can be positioned on opposing sides of fold line 134 so that fold line 134 can become a preferred fold line. In some embodiments, the preferential folding is designed for providing good structural support for the electronic device and/or in a way that is aesthetically pleasing.

In addition, in some embodiments panel 104 can include multiple sets of magnetic elements that are magnetically attractive. Each set can be positioned to help the panel 104 to retain a different folded configuration. For example, there can be a first set of magnetic elements that are magnetically coupled to retain the flexible substrate 108 bent along a first preferred fold line for a first preferred folded configuration. There can additionally be a second set of magnetic elements that are magnetically coupled to retain the flexible substrate 108 bent along a second preferred fold line for a second preferred folded configuration that is different than the first preferred folded configuration. In some cases, some of the magnetic elements can be repulsive instead. This arrangement can prevent some of the non-preferred folding patterns from being formed and can bias the panel 104 to form some of the preferential folding more easily.

It should be noted that while FIG. 1C shows that magnetic elements 130 are coupled to structural elements 110, magnetic elements 130 and structural elements 110 do not have to be separate entities. That is, some or all of structural elements 110 can be formed from magnetic materials. Hence, a separate magnetic element 130 may not be required. In some cases, a whole structural element 110 can be magnetic. The use of magnetic structural elements 110 allows magnets to be less visible. Also, since a panel 104 can include a large number of structural elements 110, this can allow flexibility in selecting the appropriate locations of magnetic elements.

In order to retain panel 104 in certain three-dimensional configurations, panel 104 can further optionally include wires 132 along some or all fold lines. Wires 132 can be thin and bendable so that wires 132 do not prevent panel 104 from being folded but at the same time provide additional structural support to panel 104. In one case, multiple wires 132 can form a network of internal skeleton along some or all fold lines so that a three-dimensional configuration of panel 104 can withstand a significant weight or load without collapsing.

Figure 2A:
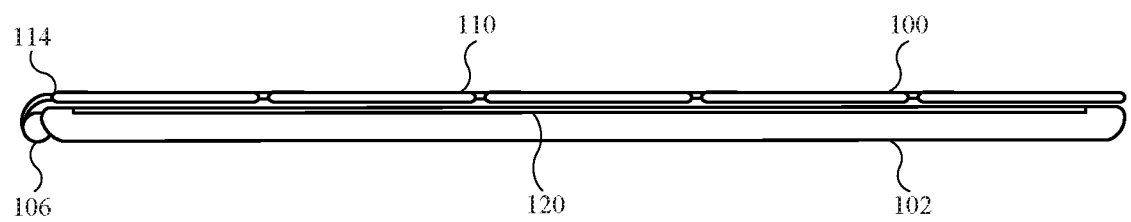
FIGS. 2A, 2B and 2C illustrate different configurations of an electronic system including an accessory and an electronic device in accordance with some embodiments.
Figure 2B:
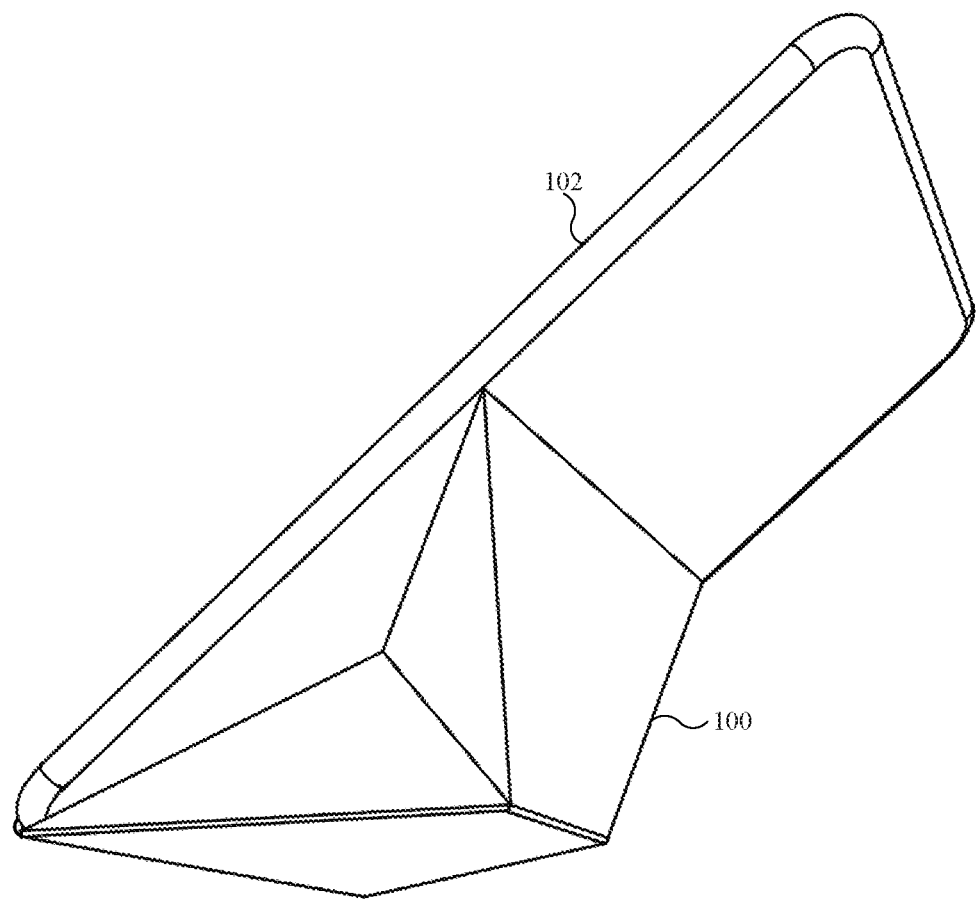
Figure 2C:
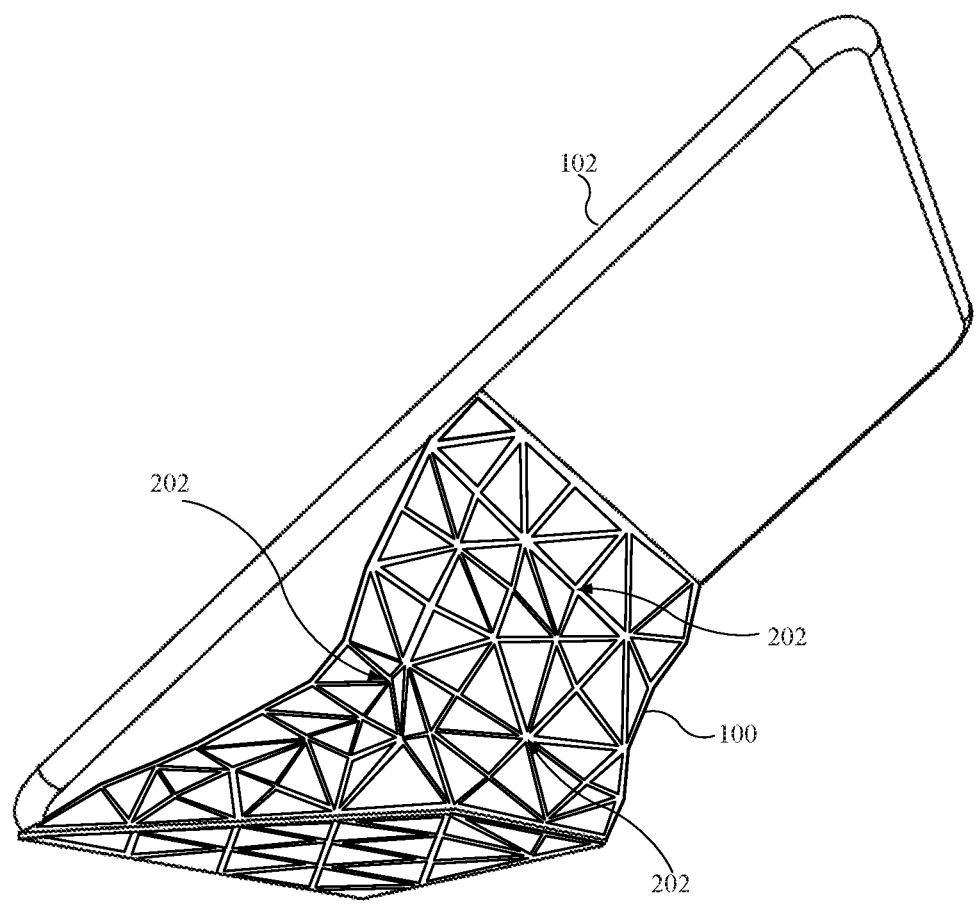

FIGS. 2A and 2B illustrate different added benefits accessory 100 can provide to electronic device 102, depending on the shape of accessory 100 and the position and orientation of accessory 100 relative to electronic device 102. In some embodiments, accessory 100 can have a size and shape in accordance with electronic device 102. As illustrated in FIG. 2A, in one configuration, accessory 100 can stay flat and be brought in contact or near in contact with display assembly 120 to cover display assembly 120. The flexible substrate 108 of accessory 100 can protect display assembly 120 from being scratched and the structural elements 110 can shield display assembly 120 and electronic device 102 from impact. The pattern of the network of structural elements 110 can also be visible from the front side and the pattern can be aesthetically pleasing. Hence, in this configuration, accessory 100 can sometimes to be referred as a cover and provide added benefit to electronic device 102 in the forms of protection and improved appearance.

FIG. 2B illustrates another benefit of accessory 100 added to electronic device 102 based on another configuration of accessory 100. In the configuration shown in FIG. 2B, accessory 100 can be pivoted along hinge portion 106 and be brought behind electronic device 102. As shown in FIG. 1A, accessory 100 can be coupled to electronic device at edge 114 and can have different fold lines along different directions relative to edge 114. Some directions can be parallel to edge 114 while other directions can be non-parallel to edge 114 such that accessory 100 can be folded into different three-dimensional configurations. The configurations can have sufficient mechanical strength to support electronic device 102 due to the structural elements 110 and/or the internal skeleton. Hence, as shown in FIG. 2B, when accessory 100 is brought behind electronic device 102, accessory 100 can be folded into a three-dimensional configuration similar to origami and can become a stand for electronic device 102 to support electronic device 102. This arrangement can allow electronic device 102 and accessory 100 be placed on a support surface (e.g. a table) and the electronic device 102 can be inclined at an angle relative to the support surface. This can provide a better view angle for users.

In addition, since accessory 100 can have high degrees of freedom in terms of its folded configurations, a three-dimensional configuration can be adjusted or reshaped to form different configurations with different heights to support electronic device 102 at different inclination angles. For example, referring to FIG. 2C, a second three-dimensional configuration of accessory 100 as a stand is illustrated. In this configuration, accessory 100 is folded into an irregular shape. Because accessory 100 is not confined to a particular configuration, multiple irregular shapes can be formed. Hence, the view angle of electronic device 102 can be finely adjusted. Moreover, the disordered shape can also provide a more stable support to electronic device 102 because the shape can create multiple concave points 202 that provide structural rigidity to the three-dimensional configuration.

Accessory 100 can also provide benefits to electronic device 102 in the form of added functionalities. In some embodiments, accessory 100 can include electrical terminals (not show in the figures) that are coupled to electronic device 102. In some cases, the electrical terminals can be electrical contacts or can be wireless transceiver that wirelessly exchanges information with electronic device 102. Accessory 100 can include electrical wiring that can be positioned with trace paths between structural elements 110. Some or all structural elements 110 can be or can include a power storage unit such as a battery. Hence, accessory 100 can additionally become a supplemental power storage system that adds power capacity to electronic device 102 by transferring at least some electrical energy stored in structural elements 110 to electronic device 102. Hence, accessory 100 can sometimes also be referred to as a charging mat.

In other embodiments, some or all structural elements 110 can be touch sensitive and those structural elements 110 can cooperate to form a touch pad that can allow users to control electronic device 102 using accessory 100. The input commands issued by the users can be transmitted to electronic device 102 via the electrical terminal either by electrical contact or wirelessly. Also, in some cases, some of the structural elements 110 can include sensors so that the device can determine the folded configuration of accessory 100. In one embodiment, the sensors can be magnetic sensors that can detect the relative positions of different magnetic elements 130, thus deducing the configuration of accessory 100.

Figure 3A:
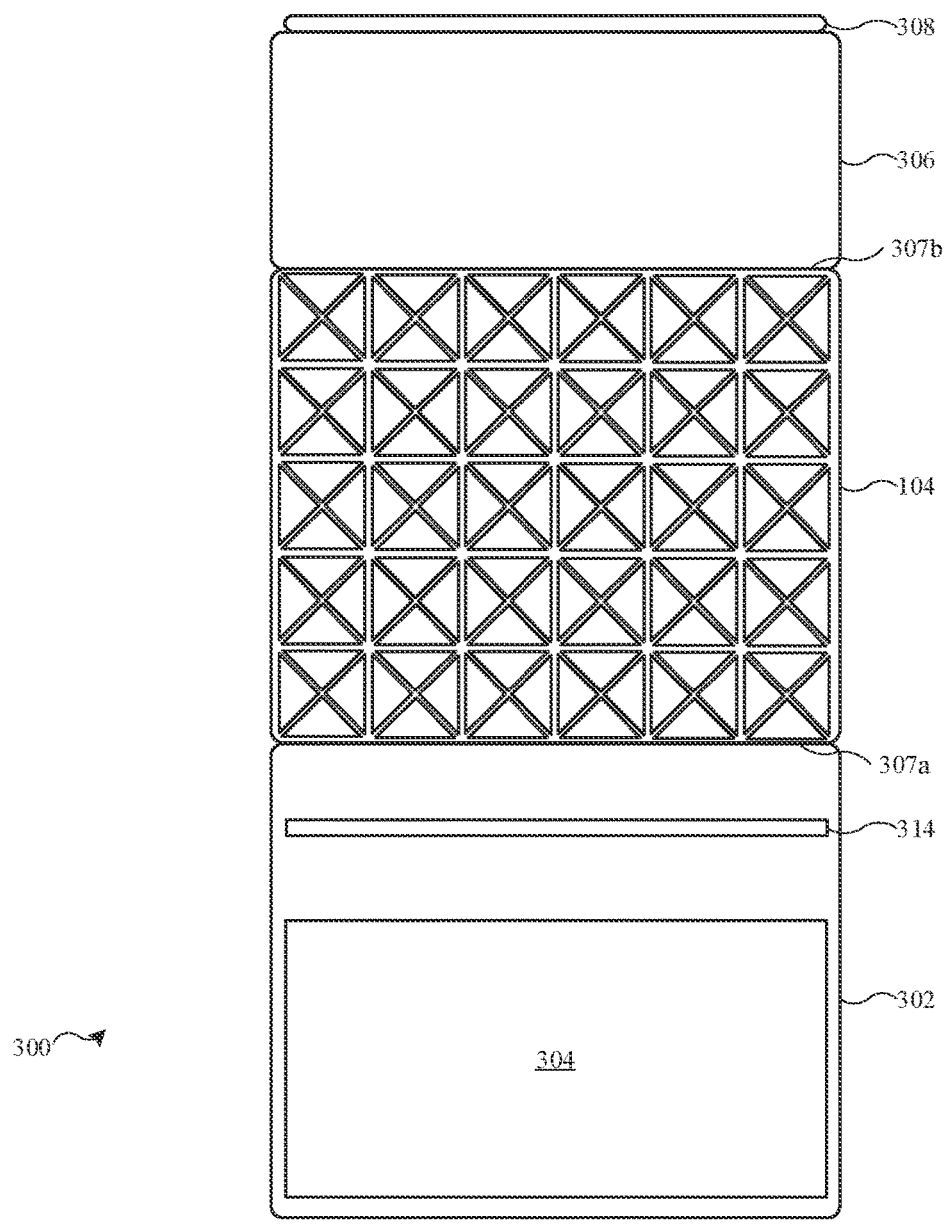
FIG. 3A illustrates an accessory including a foldable panel and an input panel in accordance with some embodiments.

FIG. 3A illustrates a front view of an accessory 300 according to some embodiments that can provide yet further additional functionalities and benefits to an electronic device (not shown in FIG. 3A). Accessory 300 can include foldable panel 104 coupled to an input panel 302 that can include an input device 304 such as a keyboard or a touch pad. Foldable panel 104 can be removably or fixedly coupled to input panel 302 along a first end 307a of the foldable panel 104. In the cases of removable coupling, foldable panel 104 and input panel 302 can be two separate accessories that can be coupled to an electronic device separately and can be coupled to the electronic device together. Foldable panel 104 can be attached to input panel 302 through magnetic coupling, frictional fit, mechanical fastening or any other combination of mechanical or magnetic ways. In the cases of fixedly coupling, foldable panel 104 and input panel 302 can be an integrated single piece or may share a common substrate. Accessory 300 can additional include panel 306 that can be coupled to foldable panel 104 at along a second end 307b of the foldable panel 104 that is the first end 307a. However, it should be noted that panel 306 can be optional and can be part of the foldable panel 104. In some instances, the panel 306 is referred to as a "first panel" and the input panel 302 is referred to as a "second panel." Accessory 300 can include hinge portion 308 that can be located at different possible positions. In the particular arrangement shown in FIG. 3A, hinge portion 308 can be located at an edge of panel 306.

Figure 3B:
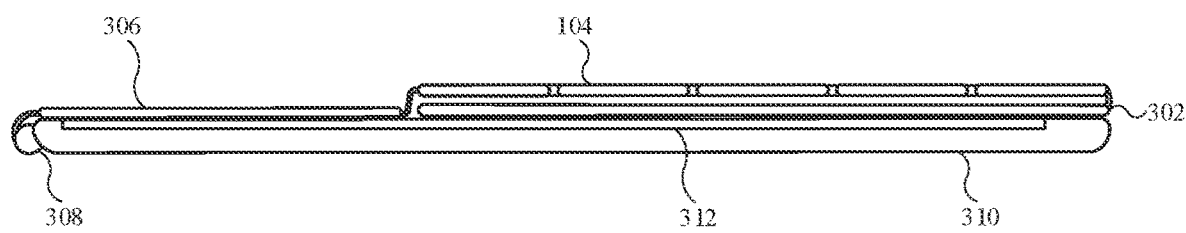

FIGS. 3B, 3C, and 3D illustrate different configurations of accessory 300 when accessory 300 is coupled to electronic device 310. Accessory 300 can be pivoted relative to electronic device 310 via hinge portion 308. In FIG. 3B, input panel 302 can be folded onto foldable panel 104 and accessory 300 can stay general flat and be brought in contact or near in contact with display 312 of electronic device 310 to protect electronic device 310. Hence, accessory 300 can become a cover for electronic device 310. In FIGS. 3C and 3D, accessory 300 can be pivoted partially behind electronic device 310 so that panel 306 and foldable panel 104 are brought behind electronic device 310 while input panel 302 can stay on the same side of the display 312 of electronic device 310. In those particular configurations, hinge portion 308 can be additionally coupled to receiver slot 314 on input panel 302 so that electronic device 310 may not slide beyond receiver slot 314. This configuration can essentially turn electronic device 310 with accessory 300 into an electronic system that is similar to a laptop computer. Input panel 302 that can include input device 304 (such as a keyboard) can lie flat on a horizontal surface while electronic device 310 can be supported by foldable panel 104 at an inclination angle theta (θ) relative to the horizontal surface.

When hinge portion 308 is coupled to receiver slot 314, part of accessory 300 can form an enclosed loop when viewed from a side as shown in FIGS. 3C and 3D. For example, as shown in the particular configuration in FIG. 3C, panel 306 and five segments of structural element 110a, structural element 110b, structural element 110c, structural element 110d, and structural element 110e (such as rows of structural elements 110) can form an enclosed loop that looks like a triangle. Likewise, as shown in the particular configuration in FIG. 3D, an enclosed loop of an irregular polygon is formed by panel 306 and the five rows of structural elements 110a-e. In this case, the enclosed loop looks like a rotated trapezoid with a protruding line. Since an enclosed loop is fixed at receiver slot 314, the folded configuration can become harder to collapse so that the enclosed loop can provide additional structural support based on the loop's geometrical shape to withstand the weight of electronic device 310. Because of the high degrees of freedom in terms of its folded configuration, accessory 300 can have different shapes of enclosed loops. Each shape of enclosed loop formed by folding of accessory 300 can support accessory device 310 at a different inclination angle θ.

Therefore, foldable panel 104 can adjust the inclination angle θ of electronic device 310 by adjusting or rearranging the configurations of foldable panel 104. For example, in FIG. 3C, foldable panel 104 can be folded such that some of the rows of structural elements 110a-e can be placed horizontally and folded onto each other. In the particular configuration shown in FIG. 3C, the second to fourth rows of structural elements (counting from structural element 110a in FIG. 3C) can overlap each other. A first and second set of magnetically attractive elements 316 and 318 can be positioned along or near some fold lines in this configuration so that the first and second set of magnetically attractable elements 316 and 318 can be magnetically coupled to retain the flexible material of panel 104 bent along those fold lines. For example, as shown in FIG. 3C' (an enlarged view of a region of FIG. 3C), first and second set of magnetically attractive elements 316 and 318 can be located at some of the second row and third row of structural elements 110b and 110c, respectively, so that the second and third row of structural elements 110b and 110c can be attracted together. It should be noted that first and second set of magnetically attractive elements 316 and 318 can also be other attachment mechanism or fasteners instead of magnetically attractive elements. For example, a pair of hook and loop fastener such as VELCRO® can be used. In this configuration, only the structural elements 110 in the fifth row are positioned relatively vertically. Hence, the inclination angle θ can be relatively small and electronic device 310 can be placed at a relatively flat position to the support horizontal surface.

Foldable panel 104 can be folded from the configuration shown in FIG. 3C to the configuration shown in FIG. 3D. In FIG. 3D, foldable panel 104 can be folded such that more rows of structural elements 110a-e can be placed relatively vertically. The third row and the fourth row of structural elements 110 (counting from structural element 110a in FIG. 3D) can be folded onto each other and overlap each other. A second set of magnetically attractive elements 320 and 322 can be positioned along or near some fold lines in this configuration so that the second set of magnetically attractable elements 320 and 322 can be magnetically coupled to retain the flexible material of panel 104 bent along those fold lines. For example, second set of magnetically attractive elements 320 and 322 can be located at some of the third row and four row of structural elements 110 so that the third and fourth row can be attracted together. It should be noted that elements 320 and 322 can also be other attachment mechanism or fasteners instead of magnetically attractive elements. For example, a pair of hook and loop fastener such as VELCRO® can be used. The overlapping of the third and fourth rows can provide additional structure support to this configuration so that foldable panel 104 can maintain this three-dimensional configuration. In this configuration, the inclination angle θ can be relatively larger than that of FIG. 3C and electronic device 310 can be placed at a relatively steep position to the support horizontal surface.

While FIGS. 3C and 3D show two exemplary configurations into which foldable panel 104 can be folded, it should be understood that there can be many more different possibilities of three-dimensional configurations to finely adjust the inclination angle θ, thanks to the multiple fold lines present in foldable panel 104. Also, there can more any numbers of rows of structural elements 110. In some cases, foldable panel 104 can be folded in an irregular configuration and the inclination angle θ can be adjusted by slightly changing the configuration of foldable panel 104.

In addition to providing protection and support to an electronic device, in some embodiments accessory 300 can also be a supplemental power storage system. For example, structural elements 110 of foldable panel 104 in accessory 300 can be power storage units to supply power to input device 304 and/or to electronic device 310.

Figure 4:
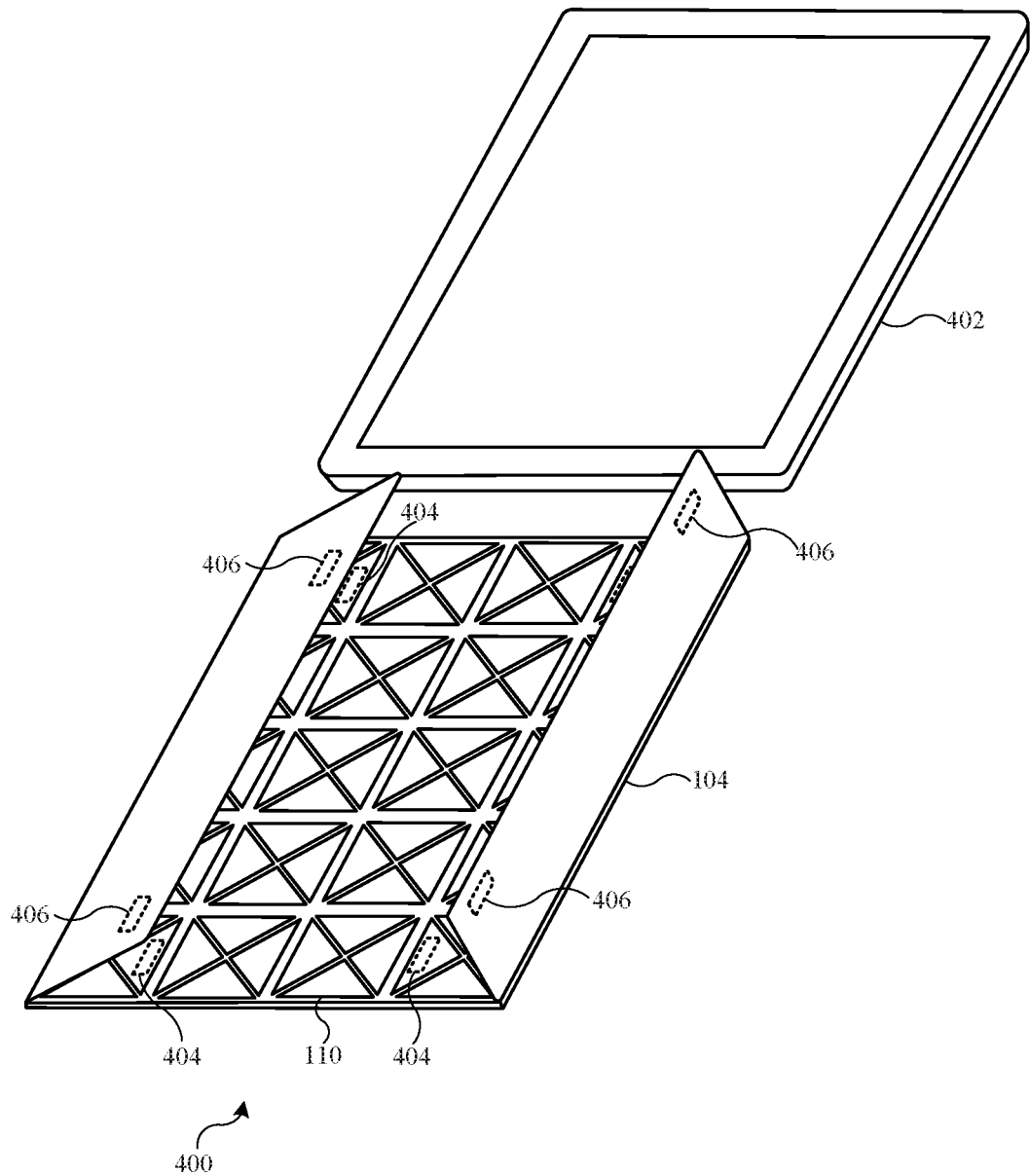
FIGS. 4 and 5 illustrate different exemplary configurations of an accessory when the accessory is coupled to different electronic devices that have different sizes.
Figure 5:
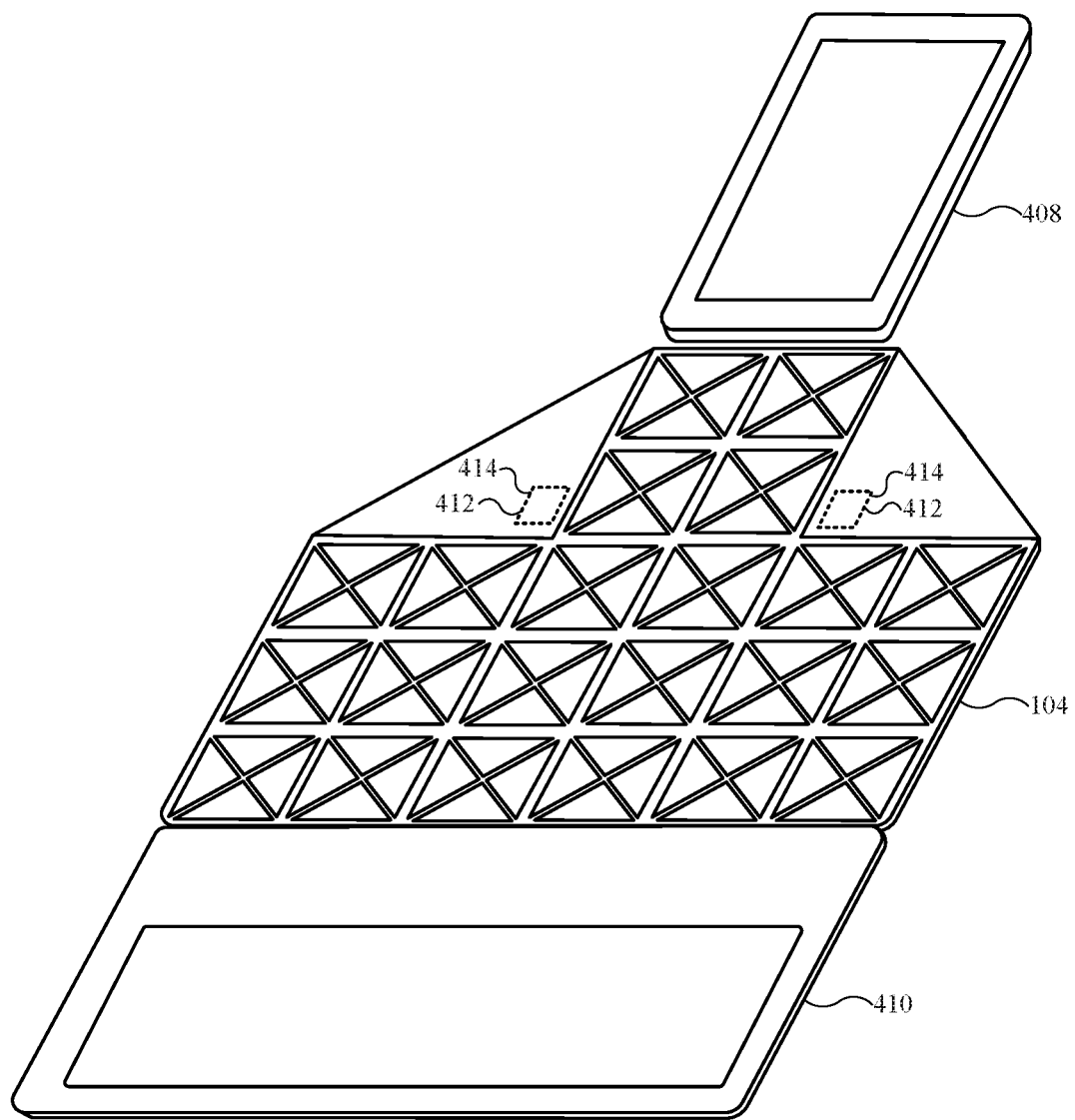

FIGS. 4 and 5 illustrate an accessory 400 in accordance with some embodiments. Accessory 400 can be coupled with different kinds of electronic devices that have different sizes. Accessory 400 can include foldable panel 104 that has a size and shape in accordance with a first electronic device. For example, a first electronic device can be electronic device 102, as shown in FIG. 1A. In addition, the same accessory 400 can be removably coupled to other electronic devices. For example, a second electronic device 402 shown in FIG. 4 can have a size that is smaller than electronic device 102. Since panel 104 is foldable, panel 104 can be folded into the size of second electronic device 402. As illustrated in FIG. 4, a column of structural elements 110 on each side of panel 104 can be folded inward and be placed on panel 104. In some cases, panel 104 can optionally include magnetically attractive elements 404 and 406 at selected locations as represented by dashed boxes in FIG. 4. When panel 104 is folded inward, magnetically attractive elements 404 are brought near magnetically attractive element 406 and the magnetically attractive elements can cooperate to form magnetic circuit that generates attractive force to help panel 104 to retain the folded configuration. It should be noted that elements 404 and 406 can also be other attachment mechanism or fasteners instead of magnetically attractive elements. For example, a pair of hook and loop fastener such as VELCRO® can be used. When panel 104 is folded into the size of second electronic device 402, accessory 400 can be used as a cover for second electronic device 402. Additionally, accessory 400 can also be pivoted behind second electronic device 402 and folded into a three-dimensional configuration to support second electronic device 402 at an inclination angle.

FIG. 5 shows a third electronic device 408 having a size that is smaller than the second electronic device 402. Accessory 400 can be coupled to third electronic device 408 at one edge and coupled to an input panel 410 at another edge opposite the third electronic device 404 (similar to the configurations shown in FIGS. 3A-3D). Two corners of panel 104 can be folded diagonally to reduce the size of panel 104 to match the dimension of third electronic device 408. In some cases, panel 104 can optionally include magnetically attractive elements 412 and 414 at selected locations as represented by dashed boxes in FIG. 5 (magnetically attractive elements 412 and 414 overlap in FIG. 5). The magnetically attractive elements can cooperate to generate attractive force to keep the two corners to stay folded. Again, other attachment mechanism can be used in place of magnetic elements. In this configuration, since only two corners of panel 104 are folded, an input panel 410 that is wider than third electronic device 408 can be used. Hence, input panels that may be designed for larger electronic devices (such as electronic device 102 or second electronic device 402) can still be used with third electronic device 408. When panel 104 is folded in a flat configuration, accessory 400 can be brought to cover third electronic device 408. Additionally, accessory 400 can also be pivoted partially behind third electronic device 408 and panel 104 can be folded into a three-dimensional configuration to support third electronic device 408 at an inclination angle while input panel 410 can lie flat on a horizontal surface.

While the accessories shown in FIGS. 1A-5 are shown as having a similar arrangement of triangular structural elements 110, it should be understood that the pattern of structural elements 110 shown is merely an example of possible arrangements of the structural elements 110. FIGS. 6-10 illustrate other examples of possible repeating patterns of structural elements. As shown in FIGS. 1E, and 6-10, it should be understood that in some cases the sizes and shapes of structural elements can be identical and in other cases the sizes and shapes of structural elements can be different. Again, it should be understood that even though more examples are provided, the examples are not intended to be exhaustive. Also, additional components and features (such as magnetic elements, power storage units, internal skeleton) discussed in associated with FIGS. 1A-5 can also be present in the embodiments shown in FIGS. 6-10.

Figure 6:
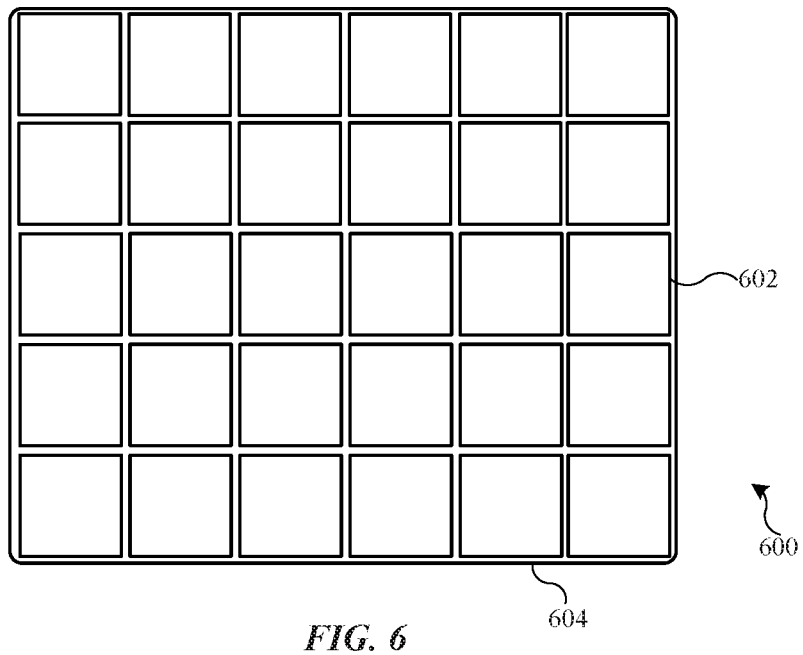
FIG. 6 illustrates an accessory having rectangular structural elements in accordance with some embodiments.

Referring to FIG. 6, a front view of a panel 600 is shown. Each structural element 602 can be rectangular (in one case specific square). The structural elements 602 can be arranged in a repeating pattern and be grouped in rows and columns. The edges of structural elements 602 can be aligned such that panel 600 can be segmented along both lateral directions and longitudinal directions. In other word, panel 600 can be folded along directions that are parallel to an edge 604 that is adapted to be coupled with an electronic device and other directions that are perpendicular to the edge 604. In one specific case, the sizes and shapes of the structural elements 602 can be identical.

Figure 7:
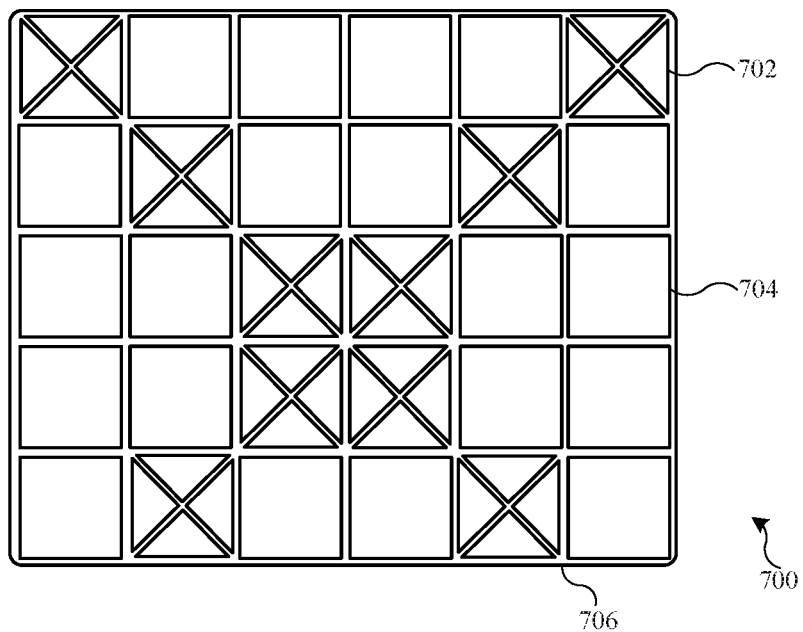
FIG. 7 illustrates an accessory having rectangular and triangular structural elements in accordance with some embodiments.

Referring to FIG. 7, panel 700 can include different types of structural elements 702 and 704. Structural elements 702 can be triangular and be arranged in a group of four to form a rectangle (in one specific case square) in selected locations. The rest of structural elements 704 can be rectangular. Under this configuration, rectangular structural elements 704 can be aligned with other rectangular structural elements 704 as well as other triangular structural elements 702 to segment panel 700 in lateral and longitudinal directions. The diagonal edges of triangular structural elements 702 can also be aligned to additionally segment panel 700 at selected diagonal directions. Hence, panel 700 can be folded along directions that are either parallel or perpendicular to an edge 706 that is adapted to be coupled with an electronic device and along selected diagonal directions. The reduced numbers of fold lines (as compared to FIG. 1B) can restraint the possible foldable configurations of panel 700 so that panel 700 can have a tendency to be folded in certain preferred ways.

Figure 8:
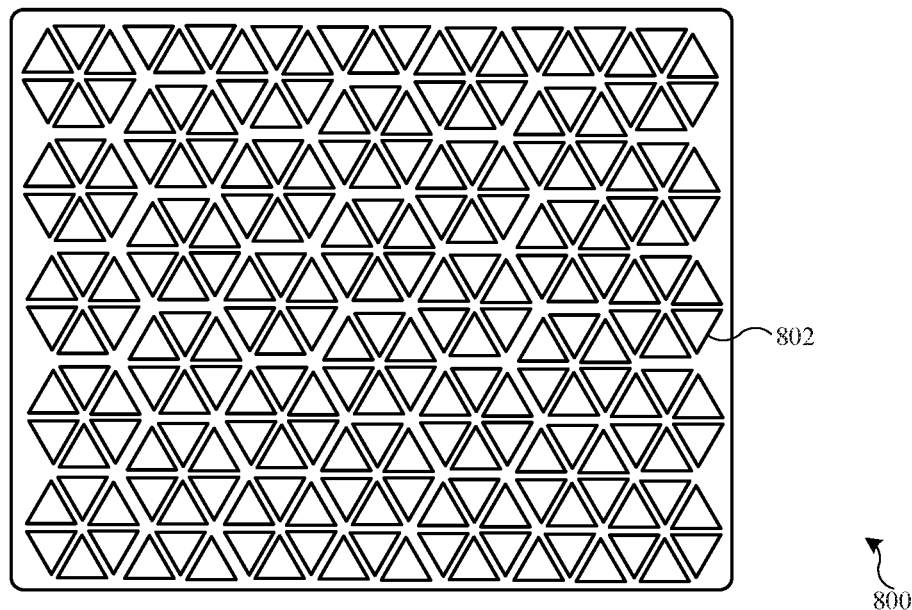
FIG. 8 illustrates an accessory having triangular structural elements grouped as multiple hexagons in accordance with some embodiments.

Referring to FIG. 8, panel 800 can include triangular structural elements 802 that can be equilateral triangles. In one case, the structural elements 802 can be identical. The triangular structural elements 802 can be divided into multiple groups of six. Each group of six triangular structural elements 802 can form a hexagon. Each group of six triangular structural elements 802 can be arranged in a radially symmetrical manner such that an edge of each triangle can form an edge of the hexagon and a vertex of each triangle can be located proximate to the center of the hexagon. The hexagon groups can be arranged in a repeating pattern. The alignment of the triangular structural elements 802 can segment panel 800 along lateral directions and two different diagonal directions that intersect with each other.

Figure 9:
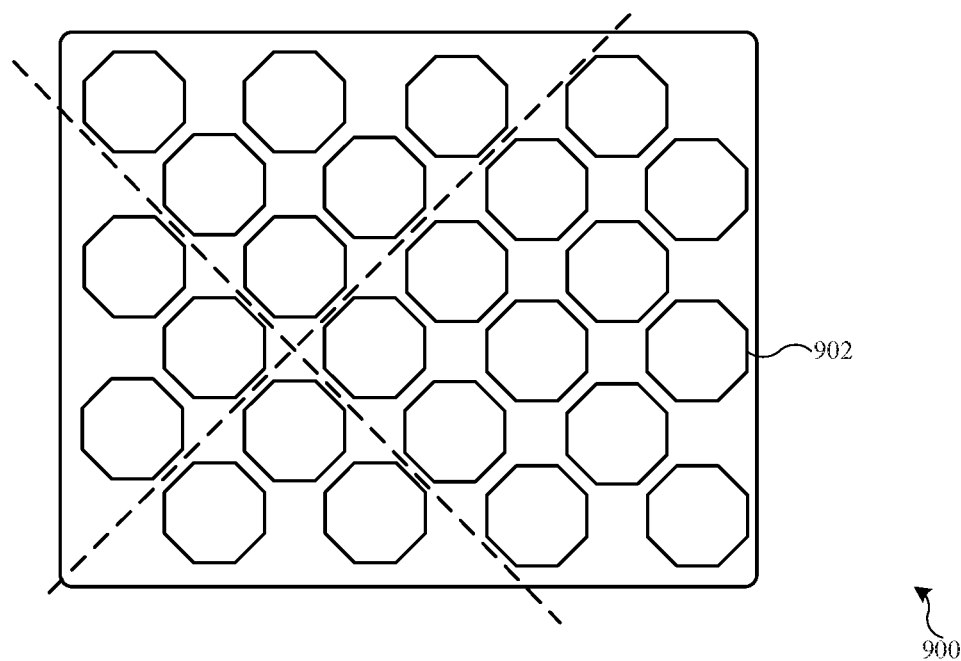
FIG. 9 illustrates an accessory having octagonal structural elements in accordance with some embodiments.

Referring to FIG. 9, panel 900 can include any polygonal structural elements 902. In the particular case shown in FIG. 9, structural elements 902 can take the form of octagons. Structural elements 902 can align along their diagonal edges so that panel 900 is segmented along different diagonal directions. It should be noted that structural elements 902 can also be aligned along lateral, longitudinal, and/or diagonal directions to define different fold lines of panel 900. The dash lines in FIG. 9 show exemplary fold lines of this particular configuration.

Figure 10:
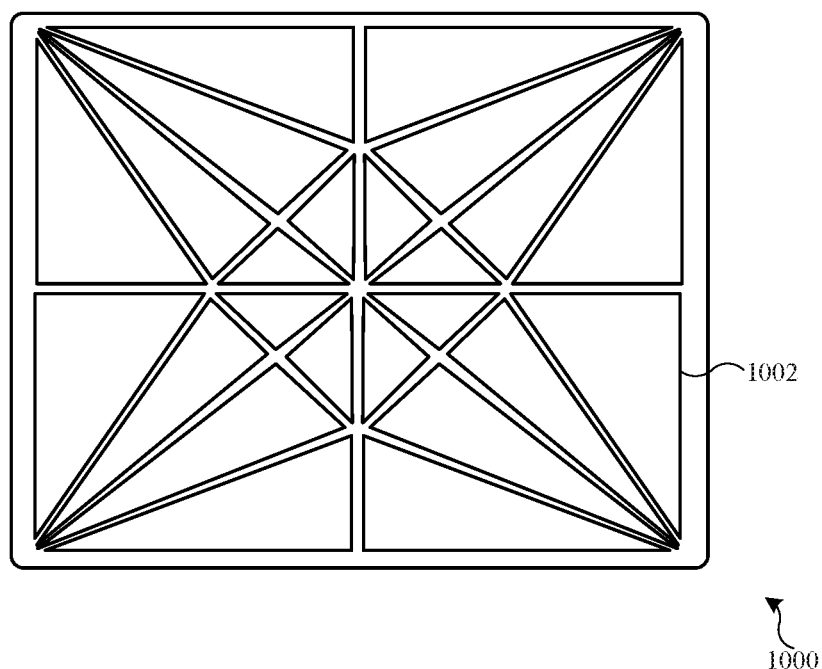
FIG. 10 illustrates an accessory having structural elements in different sizes and shapes in accordance with some embodiments.

Referring to FIG. 10, panel 1000 can include different kinds of polygonal structural elements 1002 in different sizes and shapes. In the particular panel 1000 shown in FIG. 10, the structural elements 1002 can be divided into four groups. Each group can be arranged at a quadrant of panel 1000. Within each group, each structural element 1002 can have different sizes and shapes and can be arranged in different orientations. The pattern of each group can be repeated in a radially symmetrical manner among different groups to form the particular pattern shown in FIG. 10.

Figure 11:
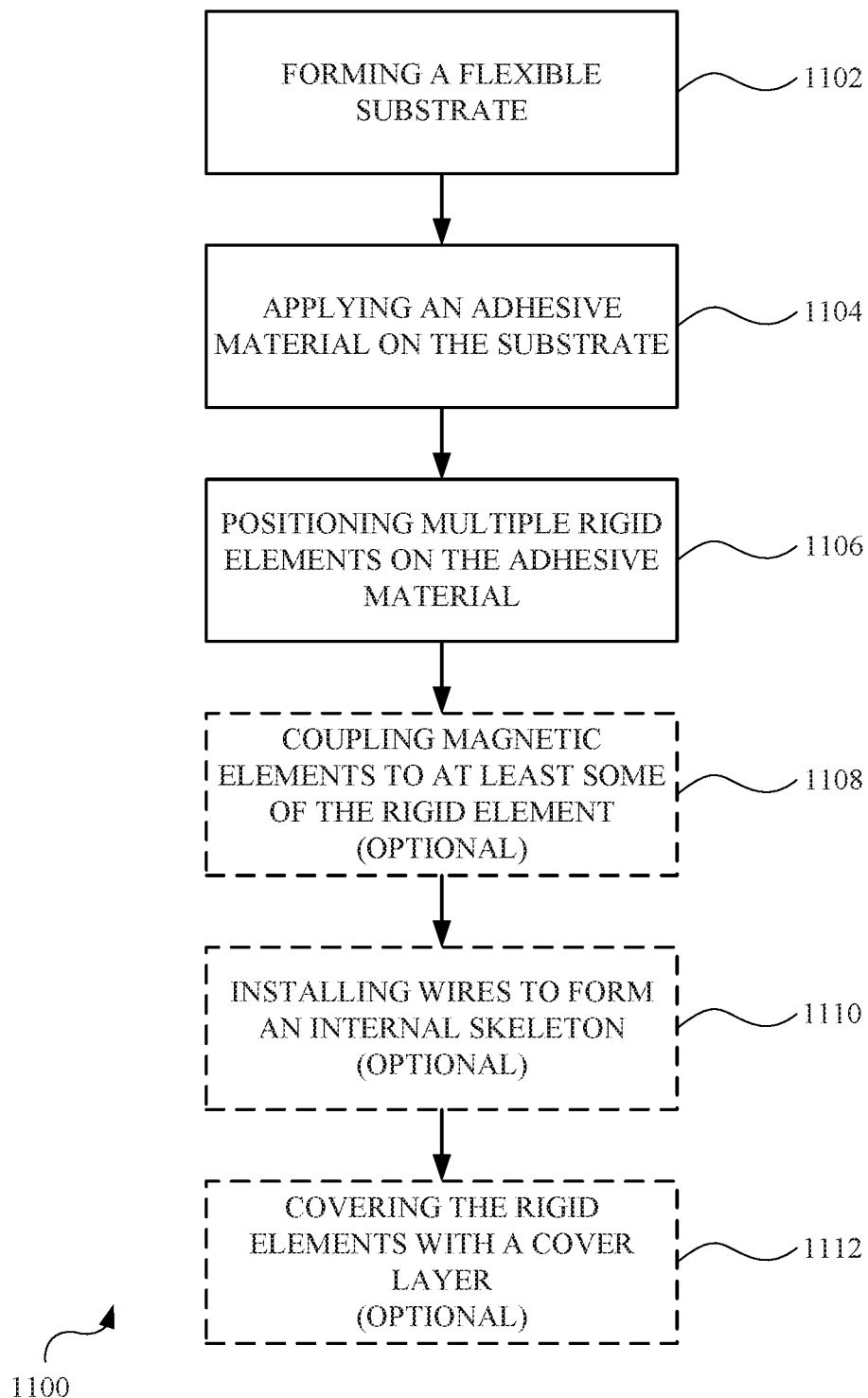
FIG. 11 is a flowchart depicting a method for forming an accessory in accordance with an embodiment.

FIG. 11 is a flow chart of an illustrative process for forming an accessory of an electronic device. The accessory can have a foldable panel and have an edge that can be configured to removably couple with the electronic device. Process 1100 can begin at step 1102. At step 1102, a substrate having a size and shape in accordance with the panel is formed. The substrate can be formed from a flexible material such as fabrics, leathers, rubbers, and/or other suitable polymers. At step 1104, an adhesive material is applied on the substrate. The adhesive material can take the form of an adhesive layer or curable adhesive.

At step 1106, multiple structural elements are positioned on the substrate. In one case, the structural elements can have generally same size and shape. Each structural element can be characterized as having a polygonal shape. The polygonal shape can be triangle, rectangle, square, parallelogram, hexagon, octagon, or any combinations of polygons. The structural elements can be formed from ceramic, metal, alloy, and/or polymer. The multiple structural elements can be positioned separately on the substrate and be arranged in a repeating pattern. The structural elements can be aligned along edges of the structural elements such that the flexible substrate is allowed to bend along a fold line between some of the structural elements. In one case, at least one fold line can intersect with a second fold line. In some cases, at least some fold lines can be non-parallel to the edge configured to removably couple with the electronic device and some other fold lines can be parallel to the edge.

At step 1108, multiple magnetic elements such as permanent magnets or ferromagnetic materials are optionally coupled to some or all of the structural elements. In some cases, the structural elements can themselves be magnetic. At step 1110, wires are optionally installed, for example along spaces separating the structural elements, to form an internal skeleton structure that can offer additional support to the panel. In some cases, wires can also be installed to connect structural elements, for example, by connect two structural elements by a wire.

At step 1112, internal components of the panel—such as the structural elements, the magnetic elements, and the wires—are optionally covered and hidden from view with a cover layer. In some cases the cover layer is made of the same material as the substrate. The internal components can be secured to the cover layer by an adhesive, or in some cases, by molding, by stitching, or by any other suitable mechanical fastening, depending on the type of materials used for the cover layer and the substrate. In some embodiments, no cover layer is used, such that the structural elements are exposed.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data that can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory for use with an electronic device, comprising:
    a flexible substrate having an edge;
    structural elements carried within the flexible substrate, the structural elements comprising a first structural element and a second structural element separated from the first structural element by foldable regions and arranged in a pattern such that the first structural element and the second structural element are movable in accordance with the foldable regions along (i) a first fold line that is non-parallel to the edge and (ii) a second fold line that is parallel to the edge;
    a first panel connected to a first end of the flexible substrate;
    a hinge portion extending from the first panel, the hinge portion configured to couple with the electronic device; and
    a second panel connected to a second end of the flexible substrate, the second end opposite the first end; and
    an input device carried by the second panel, the input device capable of providing a command to the electronic device.

2. The accessory of claim 1, wherein the first structural element and the second structural element each comprise a triangular shape.

3. The accessory of claim 1, wherein the structural elements comprises a first set of magnetic structural elements and a second set of magnetic structural elements, and wherein (i) when the flexible substrate is in a first folded configuration, the first set of magnetic structural elements are magnetically coupled to retain the flexible substrate, and (ii) when the flexible substrate is in a second folded configuration, the second set of magnetic structural elements are magnetically coupled to retain the flexible substrate.

4. The accessory of claim 3, wherein the first set of magnetic structural elements are positioned on opposing sides of the first fold line and the second set of magnetic structural elements are positioned on opposing sides of the second fold line.

5. The accessory of claim 3, wherein some of the first set of magnetic structural elements and the second set of magnetic structural elements are permanent magnets.

6. The accessory of claim 1, wherein the structural elements are arranged in rows and columns.

7. The accessory of claim 1, wherein all of the structural elements are triangular.

8. An accessory configured to removably couple with an electronic device, the accessory comprising:
    a flexible substrate carrying structural elements, the structural elements comprising:
        a first structural element,
        a second structural element separated from the first structural element by a first fold line, the first fold line defined by a first dip and a second dip positioned between the first structural element and the second structural element,
        a third structural element, and
        a fourth structural element separated from the third structural element by a second fold line that is diagonal relative to the first fold line, the second fold line defined by a third dip and a fourth dip positioned between the third structural element and the fourth structural element;
    a first wire carried within the flexible substrate and oriented along a direction defined by the first fold line, the first wire located between the first dip and the second dip; and a second wire carried within the flexible substrate and oriented along a direction defined by the second fold line, the second wire located between the third dip and the fourth dip, wherein the flexible substrate is configurable into multiple three-dimensional configurations to support the electronic device at different inclination angles, and the first wire and the second wire bend in accordance with the multiple three-dimensional configurations.

9. The accessory of claim 8, further comprising a first set of magnetic elements and a second set of magnetic elements, wherein when the accessory is in a first folded configuration, the first set of magnetic elements are magnetically coupled to retain the flexible substrate bent along the first fold line, and when the accessory is in a second folded configuration, the second set of magnetic elements are magnetically coupled to retain the flexible substrate bent along the second fold line.

10. The accessory of claim 8, wherein the first structural element, the second structural element, the third structural element, and the fourth structural element each define a triangular element that combine to define a square or a rectangle.

11. The accessory of claim 8, wherein the flexible substrate further comprises:

a slit formed between the first structural element and the second structural element, wherein the first structural element is foldable relative to the second structural element based on the slit.

* * * * *